United States Patent
Blank et al.

(10) Patent No.: US 11,680,431 B2
(45) Date of Patent: *Jun. 20, 2023

(54) VEHICULAR EXTERIOR DOOR SYSTEM WITH TOUCH SENSORS AT DOOR HANDLE

(71) Applicant: Magna Mirrors of America, Inc., Holland, MI (US)

(72) Inventors: Rodney K. Blank, Zeeland, MI (US); Eric Peterson, West Olive, MI (US); Nathan Z. Hellwig, Caledonia, MI (US); Michael T. McNally, Caledonia, MI (US); Gregory A. Huizen, Hudsonville, MI (US); Kenneth C. Peterson, Ada, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/931,201

(22) Filed: Sep. 12, 2022

(65) Prior Publication Data

US 2023/0003058 A1  Jan. 5, 2023

Related U.S. Application Data

(63) Continuation of application No. 17/249,905, filed on Mar. 18, 2021, now Pat. No. 11,441,338.

(60) Provisional application No. 62/705,229, filed on Jun. 17, 2020, provisional application No. 62/991,332, filed on Mar. 18, 2020.

(51) Int. Cl.
E05B 81/76 (2014.01)
B60Q 1/26 (2006.01)
E05B 85/10 (2014.01)
E05B 17/10 (2006.01)

(52) U.S. Cl.
CPC ............ *E05B 81/77* (2013.01); *B60Q 1/2669* (2013.01); *E05B 17/10* (2013.01); *E05B 85/10* (2013.01); *E05Y 2900/531* (2013.01)

(58) Field of Classification Search
None
See application file for complete search history.

(56) References Cited

U.S. PATENT DOCUMENTS

| | | |
|---|---|---|
| 5,371,659 A | 12/1994 | Pastrick et al. |
| 5,497,305 A | 3/1996 | Pastrick et al. |
| 5,669,699 A | 9/1997 | Pastrick et al. |

(Continued)

*Primary Examiner* — K. Wong
(74) *Attorney, Agent, or Firm* — Honigman LLP

(57) ABSTRACT

A vehicular exterior door system includes a door handle assembly configured for mounting at a door handle region of a vehicle door of a vehicle. The door handle assembly includes a pocket lighting module comprising at least one light emitting diode operable to emit light to illuminate a pocket region of the door handle region. The door handle assembly includes a plurality of touch sensors linearly arranged along a handle portion and generating sensor data based on detection of touch at the respective touch sensor. The vehicular exterior door system, with the door handle assembly mounted at the door handle region, and responsive to processing at the processor of the sensor data generated by individual touch sensors of the plurality of touch sensors, determines a touch event at the door handle assembly and, responsive to the determined touch event, unlocks the vehicle door.

38 Claims, 13 Drawing Sheets

(56) References Cited

U.S. PATENT DOCUMENTS

| | | |
|---|---|---|
| 5,671,996 A | 9/1997 | Bos et al. |
| 5,823,654 A | 10/1998 | Pastrick et al. |
| 5,938,321 A | 8/1999 | Bos et al. |
| 6,070,998 A | 6/2000 | Jennings et al. |
| 6,086,229 A | 7/2000 | Pastrick |
| 6,139,172 A | 10/2000 | Bos et al. |
| 6,149,287 A | 11/2000 | Pastrick et al. |
| 6,152,590 A | 11/2000 | Furst et al. |
| 6,176,602 B1 | 1/2001 | Pastrick et al. |
| 6,276,821 B1 | 8/2001 | Pastrick et al. |
| 6,280,069 B1 | 8/2001 | Pastrick et al. |
| 6,291,905 B1 | 9/2001 | Drummond et al. |
| 6,349,450 B1 | 2/2002 | Koops et al. |
| 6,396,408 B2 | 5/2002 | Drummond et al. |
| 6,416,208 B2 | 7/2002 | Pastrick et al. |
| 6,477,464 B2 | 11/2002 | McCarthy et al. |
| 6,550,103 B2 | 4/2003 | Koops et al. |
| 6,568,839 B1 | 5/2003 | Pastrick et al. |
| 6,907,643 B2 | 6/2005 | Koops et al. |
| 6,977,619 B2 | 12/2005 | March et al. |
| 7,407,203 B2 | 8/2008 | Huizenga et al. |
| 7,635,210 B2 | 12/2009 | Metros et al. |
| 8,333,492 B2 | 12/2012 | Dingman et al. |
| 8,764,256 B2 | 7/2014 | Foote et al. |
| 8,786,401 B2 | 7/2014 | Sobecki et al. |
| 8,801,245 B2 | 8/2014 | De Wind et al. |
| 9,290,970 B2 | 3/2016 | De Wind et al. |
| 9,484,626 B2 | 11/2016 | Dykhouse |
| 10,569,697 B2 | 2/2020 | Huizen et al. |
| 11,441,338 B2 * | 9/2022 | Blank .................. B60Q 1/2669 |
| 2007/0230201 A1 | 10/2007 | Oba et al. |
| 2007/0258258 A1 | 11/2007 | Wang |
| 2010/0007463 A1 | 1/2010 | Dingman et al. |
| 2010/0088855 A1 | 4/2010 | Ruse et al. |
| 2010/0321946 A1 | 12/2010 | Dingman et al. |
| 2011/0148575 A1 | 6/2011 | Sobecki et al. |
| 2012/0106182 A1 | 5/2012 | Minter et al. |
| 2013/0242586 A1 | 9/2013 | Huizen et al. |
| 2019/0106051 A1 | 4/2019 | Huizen et al. |
| 2020/0102773 A1 | 4/2020 | Sobecki |
| 2020/0130646 A1 | 4/2020 | Peterson |

* cited by examiner

FIG. 8

30 → algorithm requires the signal to stop climbing to count as a touch.

31

Touch

32 → algorithm allows a tolerance to be specified to allow some signal increase during a touch.

Tolerance

34

Touch

VEHICULAR EXTERIOR DOOR SYSTEM WITH TOUCH SENSORS AT DOOR HANDLE

CROSS REFERENCE TO RELATED APPLICATIONS

The present application is a continuation of U.S. patent application Ser. No. 17/249,905, filed Mar. 18, 2021, now U.S. Pat. No. 11,441,338, which claims the filing benefits of U.S. provisional application Ser. No. 62/705,229, filed Jun. 17, 2020, and U.S. provisional application Ser. No. 62/991,332, filed Mar. 18, 2020, which are hereby incorporated herein by reference in their entireties.

FIELD OF THE INVENTION

The present invention relates to light modules for vehicles and, more particularly, to a light module for an exterior door handle for opening a side door of a vehicle.

BACKGROUND OF THE INVENTION

A door handle for a vehicle door typically includes a handle portion that is pivotable relative to a base portion, whereby pivotal movement of the handle portion pulls at a cable or rod to electrically trigger or move a latch mechanism to release the latch and open the door.

SUMMARY OF THE INVENTION

The present invention provides a vehicular exterior door assembly or system. A door handle assembly includes a handle portion and is configured for mounting at a door handle region of a vehicle door of a vehicle. The handle portion is disposed at a pocket region of the door handle region. The door handle assembly includes a pocket lighting module including at least one light emitting diode and, with the door handle assembly mounted at the door handle region, the at least one light emitting diode is operable to emit light to illuminate the pocket region of the door handle region. The door handle assembly includes a plurality of touch sensors disposed at the handle portion that are linearly arranged along the handle portion. Each of the plurality of touch sensors has a respective touch sensitivity and generates sensor data based on the respective touch sensitivity and detection of a touch at the respective touch sensor. The plurality of touch sensors includes at least two touch sensors having different respective touch sensitivities. A processor is operable to process the sensor data generated by the plurality of touch sensors. A controller, responsive to processing at the processor of the sensor data generated by the plurality of touch sensors, determines a touch event at the door handle assembly. The determined touch event includes a user touching the handle portion. The controller, responsive to detecting the touch event, locks or unlocks the vehicle door.

These and other objects, advantages, purposes and features of the present invention will become apparent upon review of the following specification in conjunction with the drawings.

BRIEF DESCRIPTION OF THE DRAWINGS

FIG. 8 is a plot of an original touch algorithm and a plot of a modified touch algorithm in accordance with the present invention;

DESCRIPTION OF THE PREFERRED EMBODIMENTS

Figure 1:
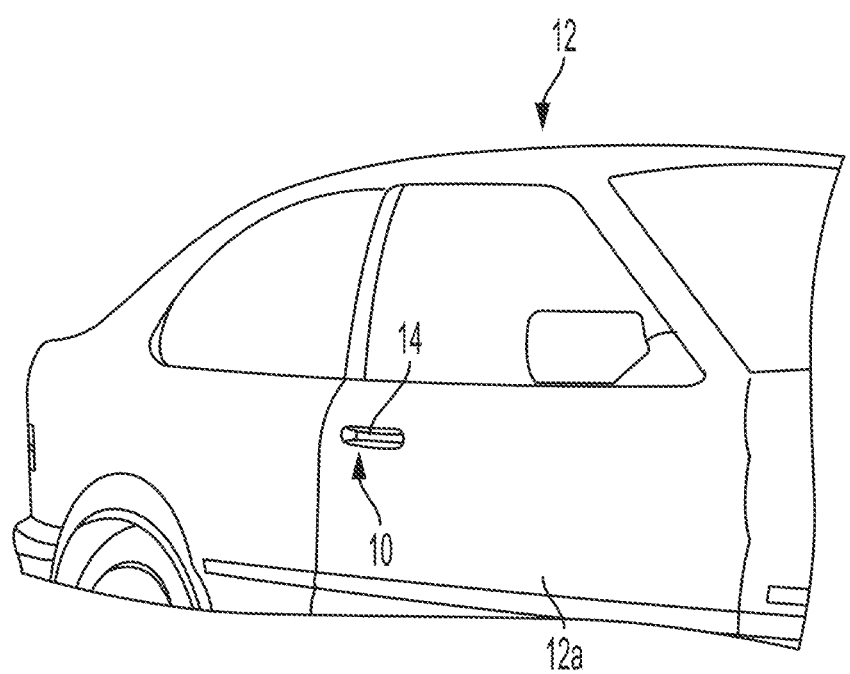
FIG. 1 is a perspective view of a vehicle with a door handle assembly of the present invention.

Referring now to the drawings and the illustrative embodiments depicted therein, a vehicle door handle assembly 10 is mountable to a door 12a of a vehicle 12 and operable to release a latch mechanism (not shown) of the door 12a to open the vehicle door (FIG. 1). Vehicle door handle assembly 10 includes a handle portion 14 that is disposed at the door and that is fixedly mounted at the door or to a bracket mounted to the door.

The door handle assembly may include a lighting module that is operable to illuminate the pocket or recess at the door behind the handle portion 14. When actuated, the lighting module (that comprises one or more light emitting diodes) provides illumination at the pocket region. The door handle assembly and lighting module may utilize aspects of the assemblies and modules described in U.S. Pat. No. 10,569,697 and/or U.S. Publication No. US-2020-0130646, which are hereby incorporated herein by reference in their entireties.

Figure 2:
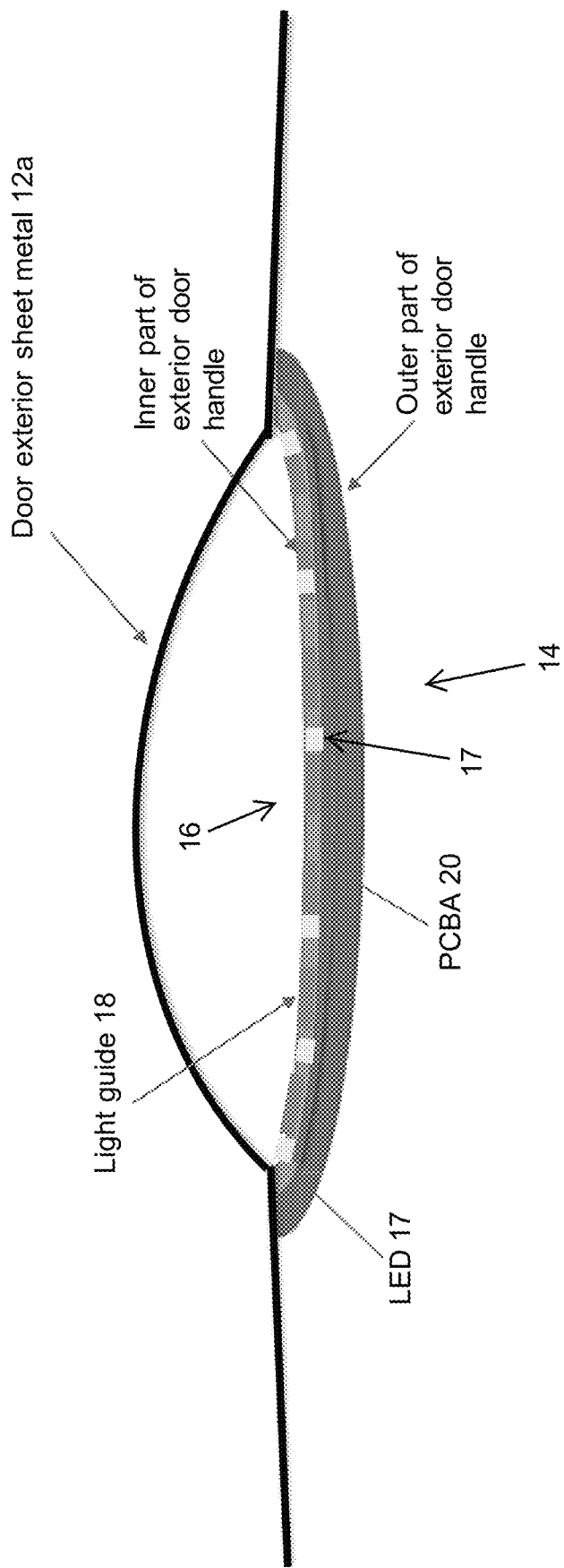
FIG. 2 is a plan view of a cross section of a door handle that includes LED lighting.
Figure 3:
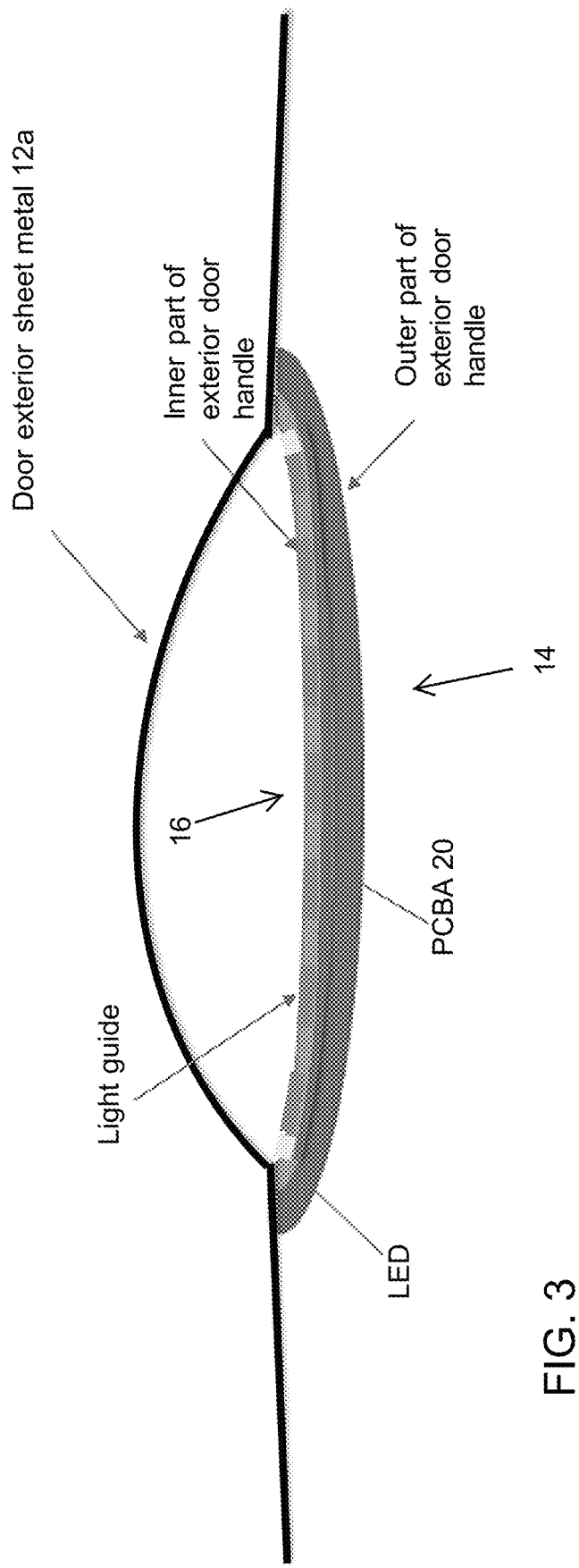
FIG. 3 is a plan view of a cross section of another door handle that includes LED lighting.
Figure 4:
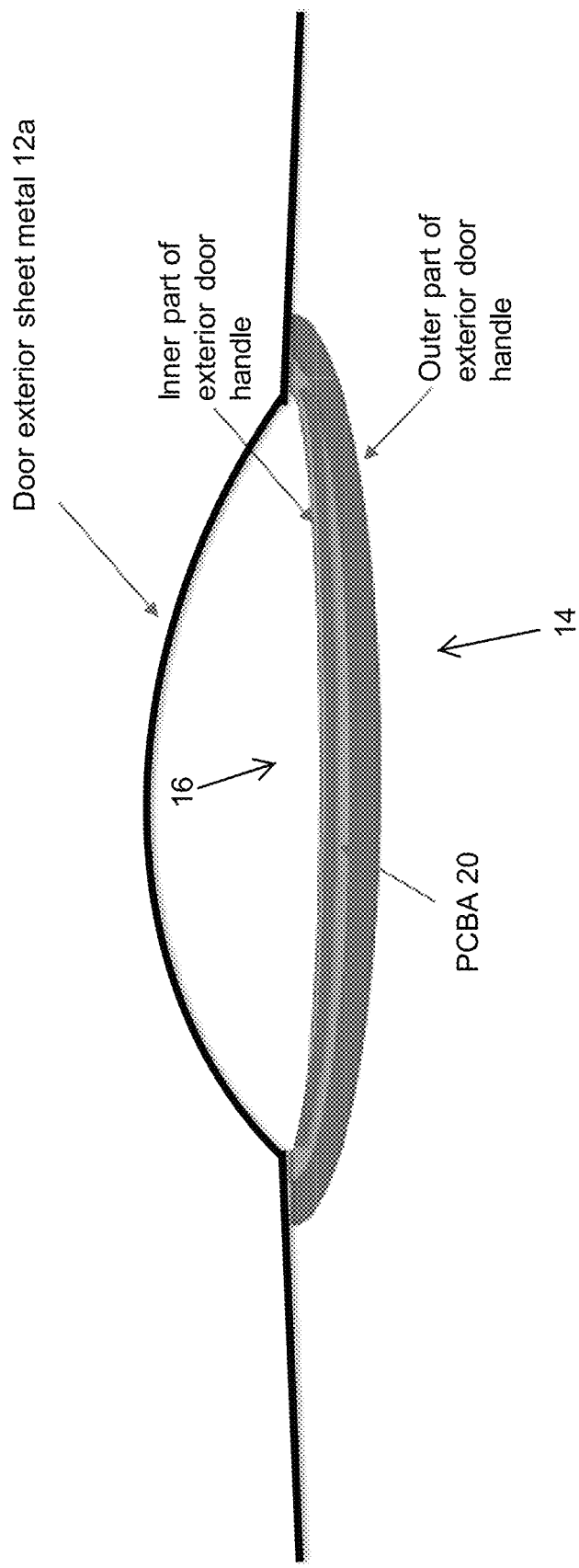
FIG. 4 is a plan view of the door handles of FIG. 2 and FIG. 3.

The module may be disposed at the inside portion of the handle. For example, and such as shown in FIGS. 2-4, the lighting module 16 is disposed along the inside portion of the handle portion 14. As illustrated in FIG. 2, the lighting module 16 includes one or more light emitting diodes (LEDs) 17 disposed at a printed circuit board assembly (PCBA) 20 with a translucent or transparent cover element 18 (i.e., a light guide) that forms part of the inside surface of the handle portion. When activated, light emitted by the LEDs passes through the cover element to illuminate the pocket region. The cover element 18 may also include a diffusion material behind it in order to disperse the light so that the user does not see light hot spots. The diffusion material may be uniform or may have different patterns of diffusion, such as, for example, a hex pattern, to display the light at the door handle in different patterns. The LEDs are located in the door handle strap and arranged so as to face approximately perpendicular to the door sheet metal or pocket, with light guide portions provided along the inner part of the door handle to facilitate illumination of the pocket region when the LEDs are energized (FIG. 2). Optionally, instead of a plurality of LEDs, the pocket light may comprise a single LED or light source, with a light pipe that transmits light across the inside portion of the door handle, with light guide portions provided along the inner part of the door handle to facilitate illumination of the pocket region when the LED or LEDs is/are energized (FIG. 3). The LED or LEDs may be disposed at either the forward end or rearward end (or one or more LEDs at each end) of the door handle strap and aimed or oriented so as to direct or emit light toward the pocket region.

Optionally, the lighting module may be disposed at the door handle bracket and at the pocket region. The light emitted by the LED or LEDs (when energized) provides illumination at the pocket region and may reflect off of the inside surface of the handle portion or strap and toward the ground to provide ground illumination. Optionally, the inside surface of the handle portion may comprise a reflective surface, such as a metallic or chrome plated surface, and/or may be shaped to direct light downward, to enhance reflection of light toward the ground region at the side of the vehicle. The light emitted by the LED or LEDs may provide more direct viewing of the light and may provide enhanced viewability in all ambient lighting conditions and with all vehicle and door handle paint colors.

The lighting module 16 may be incorporated into various handle types such as strap handles and paddle handles. Optionally, the light guide 18 is exposed at the door handle portion or handle region of the door. The light guide may be welded or may be formed via a two shot molding process that forms the colored plastic at the inside of the door handle or may be formed separate from the colored plastic of the inside of the door handle. The light guide 18 distributes light evenly over a length, for example, greater than 50% of the inside of the door handle. The LEDs 17 may hidden behind the colored plastic with use of the light guide.

Optionally, the LEDs and/or the light guide 18 may distribute light along the perimeter of the handle or along the edge of handle. The light guide 18 may be not visible or easily or readily viewable to a person viewing the door handle under normal circumstances (e.g., when the LEDs are deactivated). For example, the light guide may comprise a dark and/or translucent material that blends in with the surroundings (e.g., the paint or molded door handle of the vehicle).

Figure 5:
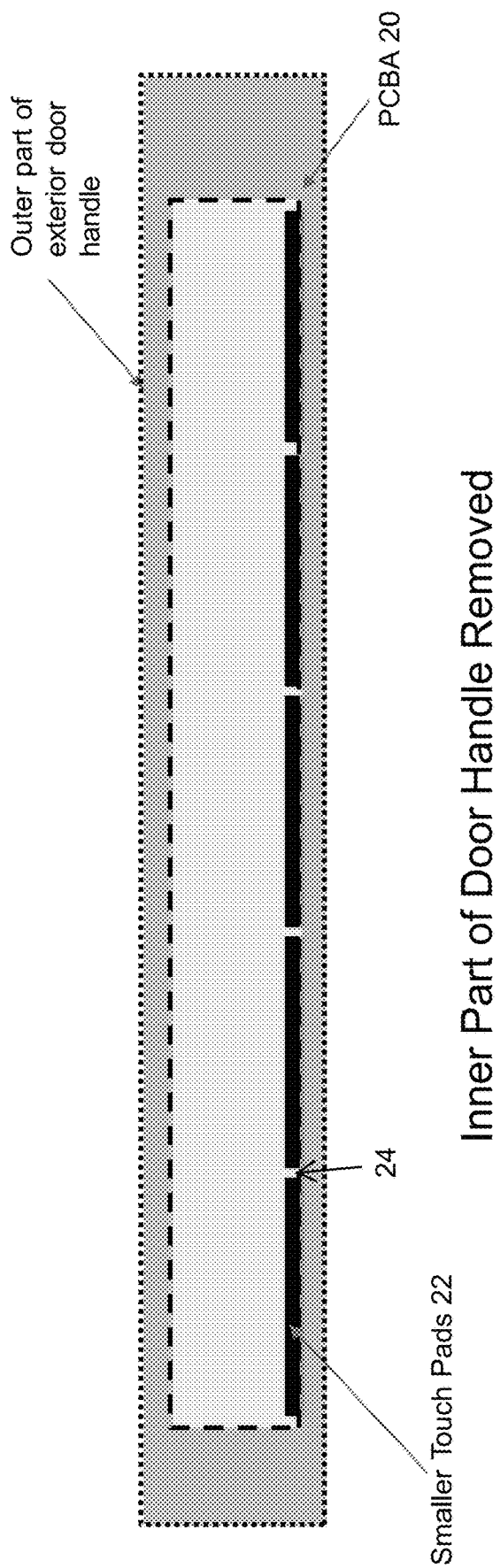
FIG. 5 is a side plan view of the door handle with an inner part of the door handle removed and with touch pads at the door handle.
Figure 6:
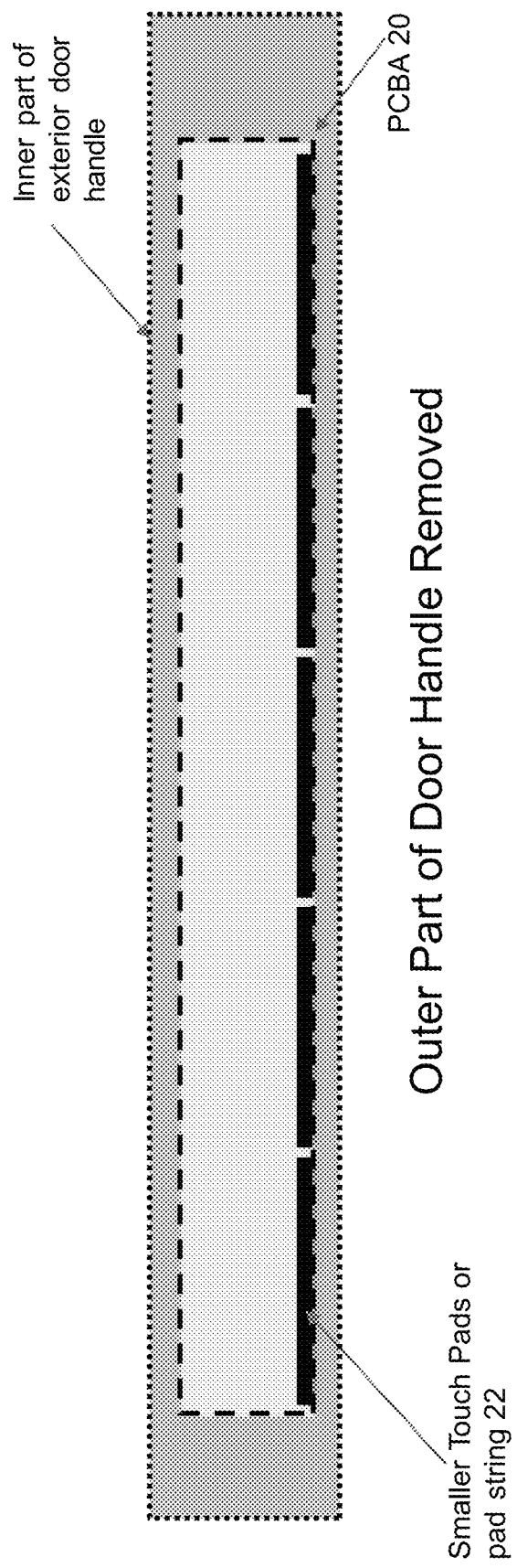
FIG. 6 is a side plan view of the door handle with an outer part of the door handle removed and with touch pads at the door handle.

Referring now to FIGS. 5 and 6, the vehicular door handle of the present invention includes a one or more touch pads 22 disposed at the printed circuit board (PCBA) 20. FIG. 5 illustrates the touch pads 22 with the inner part of the door handle removed, while FIG. 6 illustrates the touch pads 20 with the outer part of the door handle removed. The touch pads are disposed along the inner surface of the door handle 14 (e.g., a paddle or strap door handle) such that a user, when gripping the door handle, contacts one or more of the touch pads 22 with one or more fingers. When the user contacts one or more of the touch pads 22, the PCBA 20 may generate a signal to control an aspect of the vehicle. For example, the door may lock or unlock. The multiple touch pads 22 (e.g., instead of a single touch pad) improve response and performance and increase the contact area (e.g., increase the size of the lock and/or unlock area) at which the user makes contact to lock/unlock/open the door.

Optionally, the door handle includes between four and eight touch pads. Each touch pad may, for example, be between 10 mm and 20 mm in length. Smaller pad size reduces the size of the accompanying electric field which helps to prevent unwanted interference/noise and unintentional touch signals.

Gaps 24 may be provided in between each touch pad 22 and the gaps may accommodate LEDs 17 or other components on the PCBA 20. The plurality of touch pads 22 may form a line or "string" of pads that runs along a majority of the length of the door handle. The plurality of touch pads may be used to detect non-hand contact or touch noise (e.g., precipitation). Some or all of the string may be used to create a large area to control an aspect of the vehicle such as locking or unlocking the one or multiple doors.

Optionally, two or more touch pads 22 may form a group either via physical location (i.e., located near each other) or via software (i.e., logically grouped). The touch pads may form a plurality of groups, with each group including one or more touch pads. Groups of touch pads may be assigned different functionality or sensitivity or otherwise processed differently from each other. Optionally, touch pads disposed at the end of the line or string may processed differently than touch pads located on the interior of the line or string.

Figure 7A:
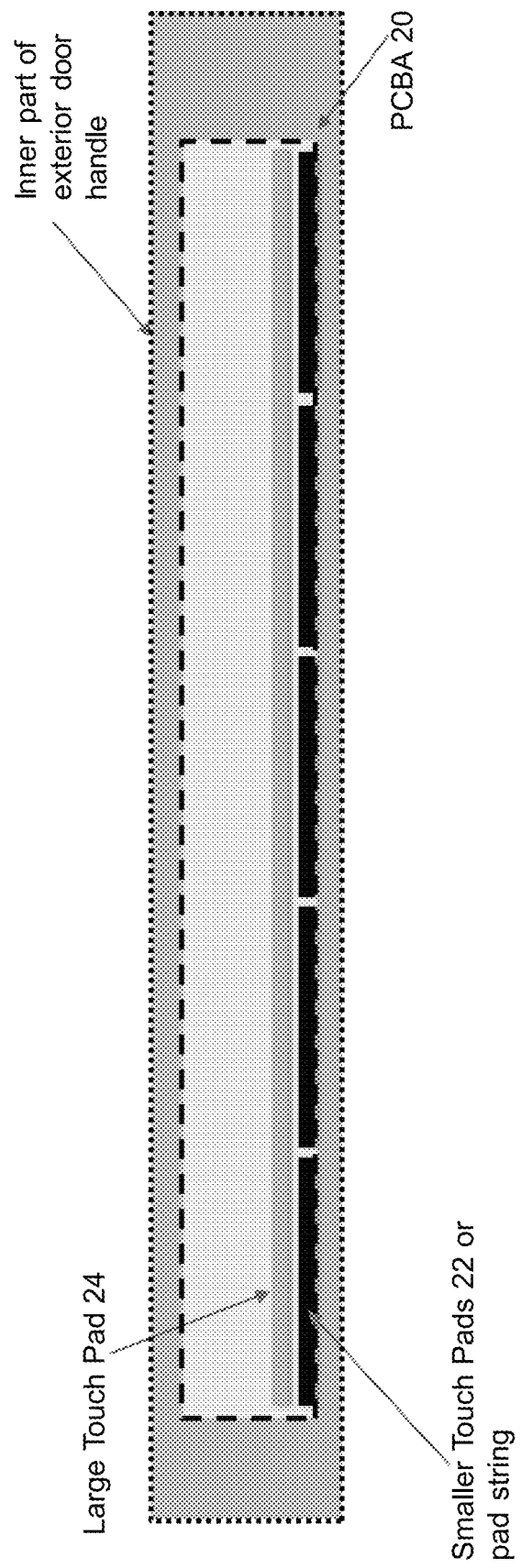
FIGS. 7A and 7B are side plan views of the door handle with an outer part of the door handle removed with touch pads disposed at the door handle.
Figure 7B:
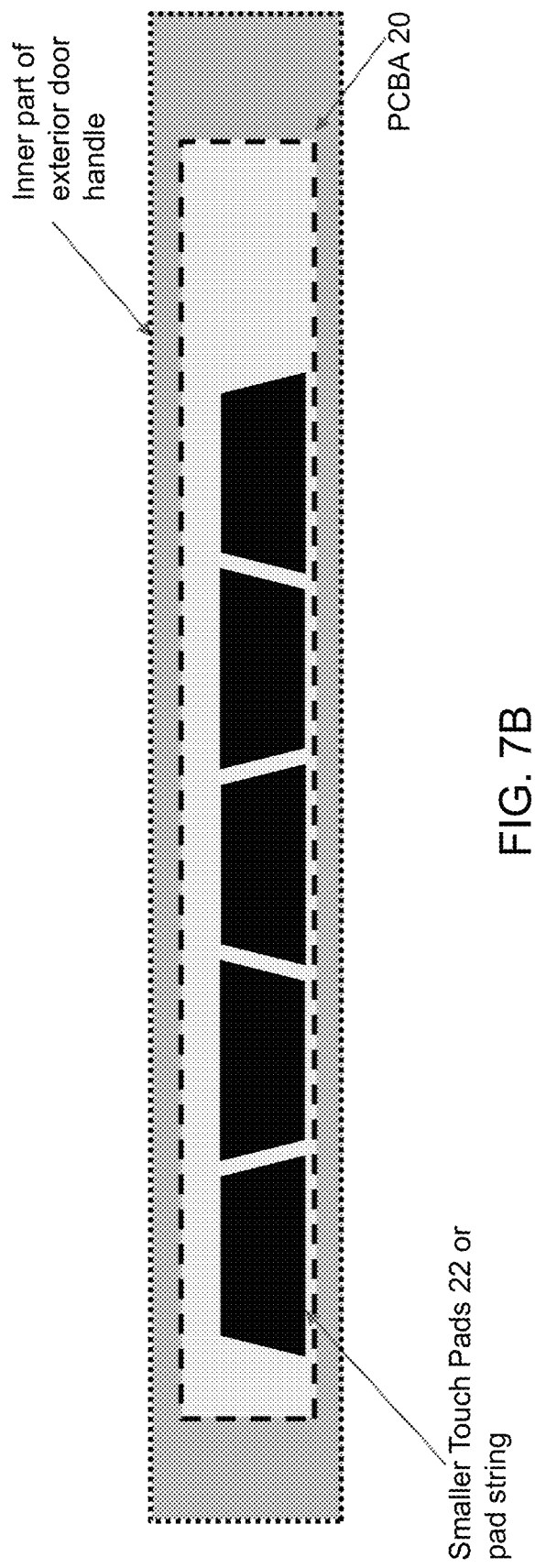

Referring now to FIG. 7A, the door handle may also include a large touch pad 24. The large touch pad may detect a user as they are approaching the door or reaching for the door handle. The large touch pad may thus provide a faster response time than the smaller touch pads 22. Optionally, the large touch pad may enter a low power mode when not in use and wake up from the lower power mode when a user is near the vehicle or reaches for the door handle to reduce power consumption. The smaller touch pads or string of touch pads may be powered down or in a low power mode until awakened responsive to the large touch pad determining approach of the user's hand toward the door handle. Optionally, and such as shown in FIG. 7B, the touch pads 24 may be larger (i.e., wider) in lieu of the large touch pad 24 of FIG. 7A.

The door handle may comprise several touch pads (e.g., 2 to 12 pads) of varying length (e.g., each pad may be 10 mm to 75 mm in length). The touch pads need not be limited to defined segmented lengths. Instead, the touch pads may overlap (e.g., on different layers of the PCB) and/or may include pad shapes of various polygons (e.g., rectangle, circle, trapezoid, triangle, etc.). Additionally, the touch pads may include portions that taper up or down towards the next touch pad in the string.

Referring now to FIGS. 8-12, touch sensors or touch pads implement a touch algorithm to determine when a touch event has occurred (i.e., a user has touched the touch sensor). As illustrated by plot 30 (FIG. 8), a touch algorithm determines a touch when the sensor output reaches a threshold level 31 and stops increasing or climbing. That is, such a touch algorithm determines a user has touched the touch sensor when the sensor output reaches and maintains a threshold value. However, plot 32 of FIG. 8 shows that a modified algorithm of the present invention allows a tolerance 34 to be specified to allow the sensor output or signal to continue to increase during a touch event. That is, as long as the signal remains above a first threshold value but below a second threshold value (i.e., within the tolerance), the modified touch algorithm registers a touch event.

Figure 9:
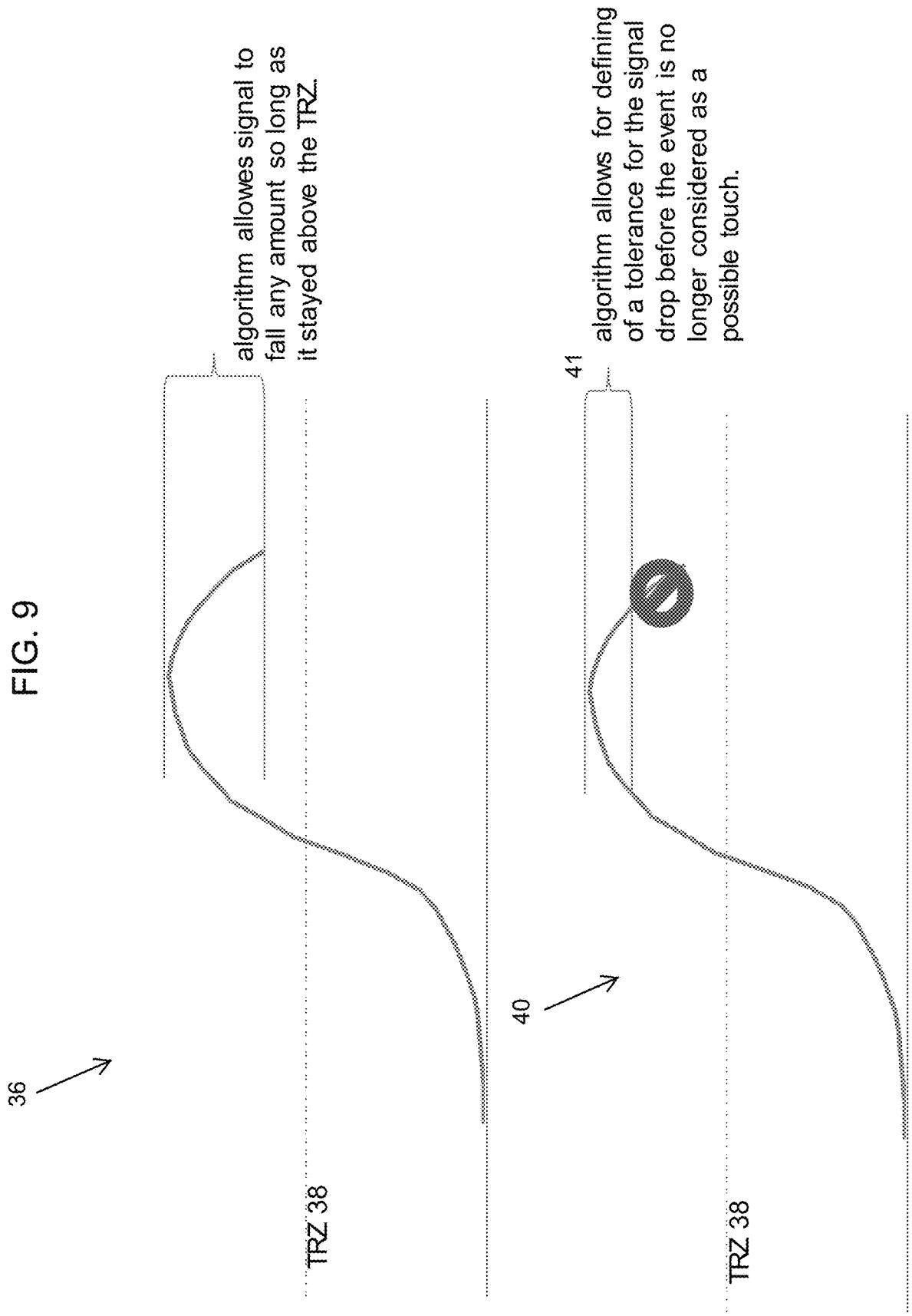
FIG. 9 is another plot of the original touch algorithm and another plot of the modified touch algorithm.

FIG. 9 includes a plot 36 that illustrates that a typical touch algorithm allows an output of the touch sensor to fall any amount as long as the signal remains above a touch recognition zone (TRZ) 38. The modified algorithm, however, provides a tolerance 42 where, when the signal output drops out of the tolerance band, but is still above the TRZ, the modified touch algorithm does not register the signal as a touch event. That is, even when the signal output remains above the TRZ 38, when the signal falls below the threshold 42 before maintaining a level above the TRZ for a threshold amount of time, the modified touch algorithm determines that a touch event did not occur.

Figure 10:
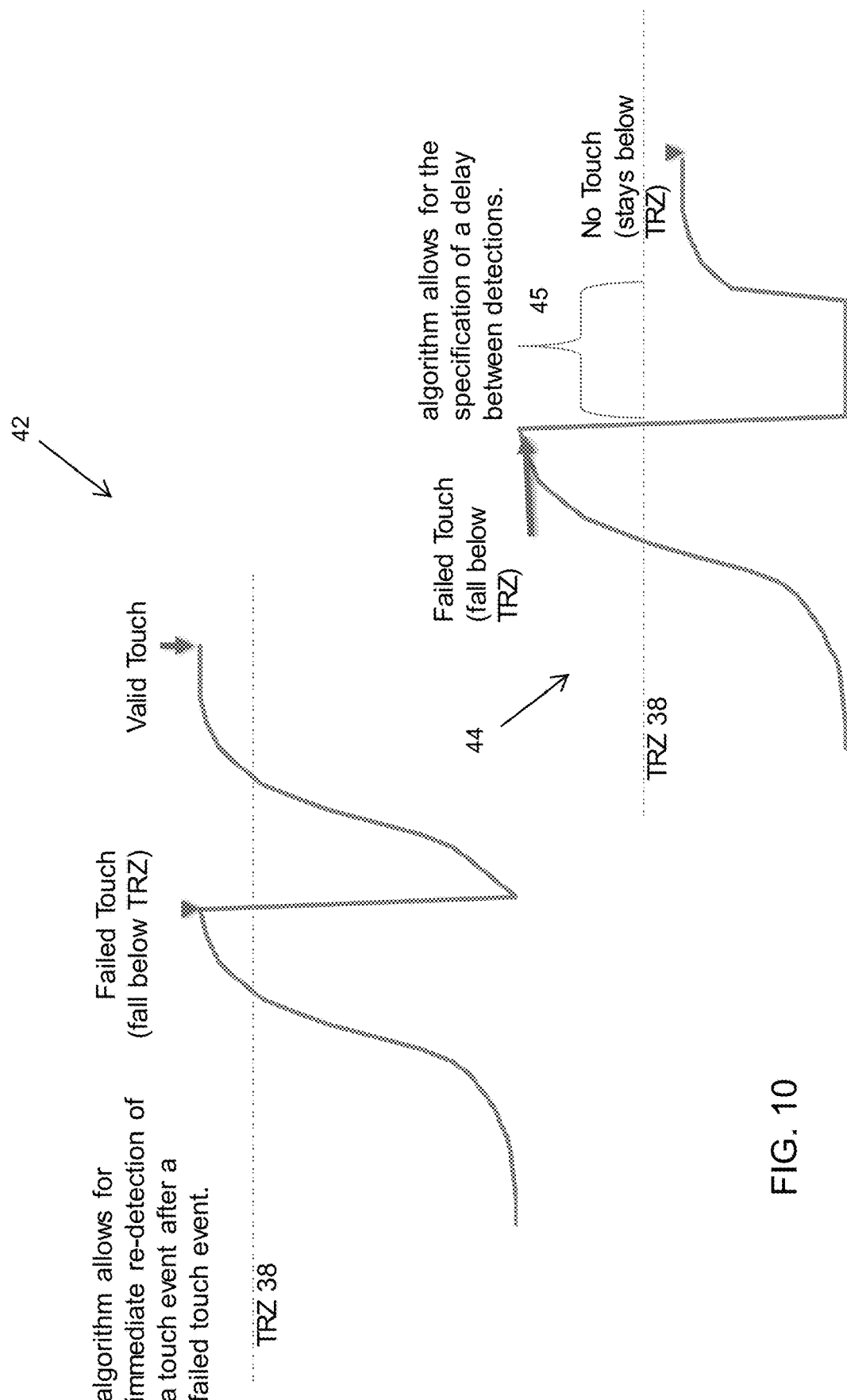
FIG. 10 is another plot of the original touch algorithm falling below a touch recognition zone and another plot of the modified touch algorithm falling below the touch recognition zone.

Referring now to FIG. 10, a plot 42 illustrates that the touch algorithm allows for an immediate re-detection of a touch event after a failed touch event. For example, when the signal output exceeds the TRZ 38, but then falls below it before a sufficient amount of time has passed, a failed touch event occurred. However, shortly afterward, the signal again surpasses the TRZ and the touch algorithm determines a valid touch event occurred. In contrast, the modified touch algorithm, as shown by plot 44, allows for the specification of a delay between detections. That is, after a failed detection, the modified touch algorithm may ignore any potential touch events for a threshold period of time 45. The amount of delay may be configurable (e.g., 1 ms, 10 ms, 100 ms, 1000 ms, etc.).

Figure 11:
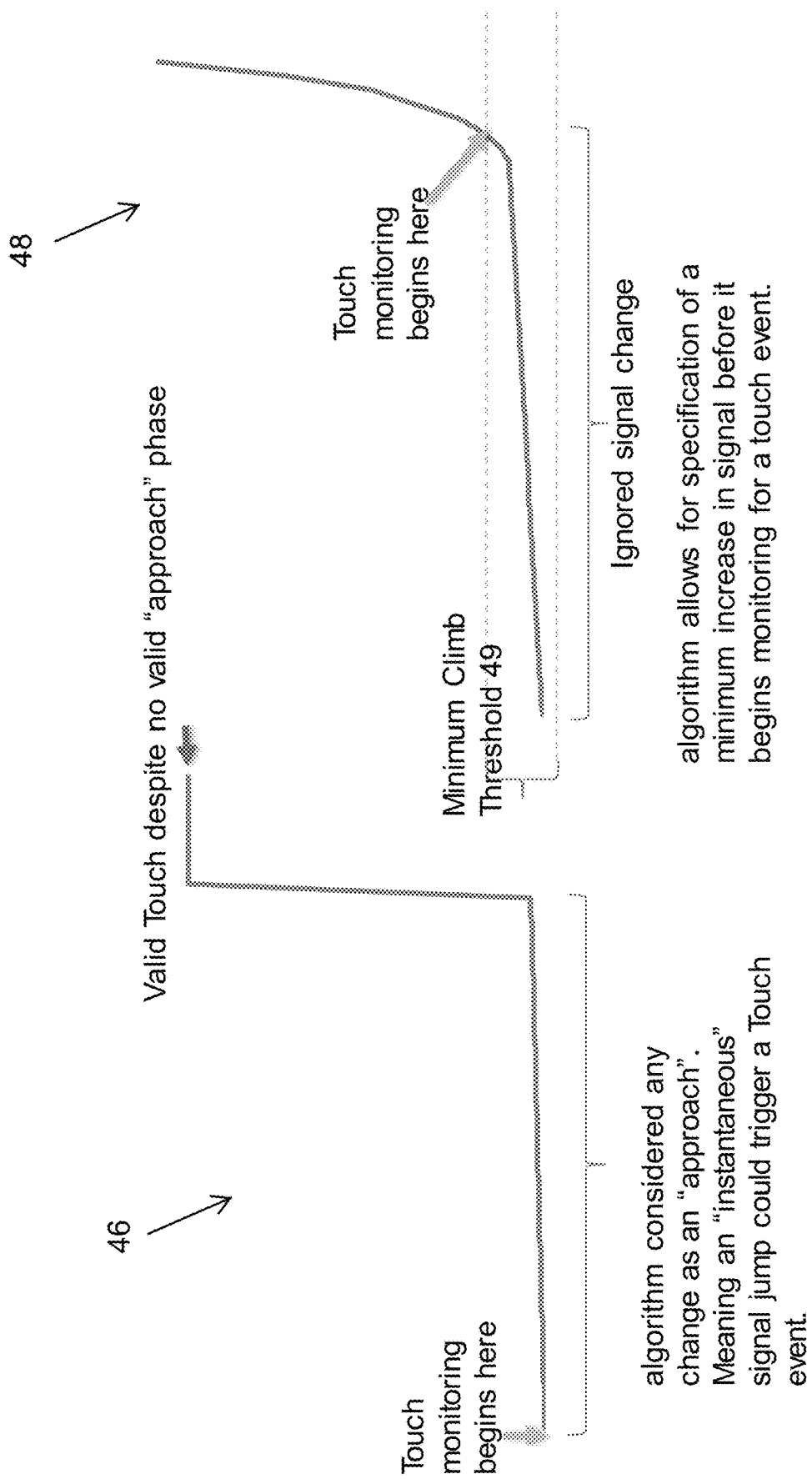
FIG. 11 is another plot of the original touch algorithm with an instantaneous signal change and another plot of the modified touch algorithm with an instantaneous signal chance.

Referring now to FIG. 11, a touch algorithm, as illustrated by plot 46, considers any change in signal value as an "approach" (i.e., the user's hand approaching the sensor) and thus a near instantaneous increase in signal value will still register as a touch event to the touch algorithm. As shown in plot 46, the first change in signal value causes the touch algorithm to being touch monitoring, and then a subsequent rapid increase in signal value registers as a touch event despite this change in signal value likely resulting from an error (e.g., noise, interference, etc.). In contrast, the touch algorithm shown in plot 48 requires a minimum climb threshold 49 prior to beginning touch monitoring. That is, the modified touch algorithm requires the signal value to ramp to a threshold value before monitoring so that a valid "approach" phase is ensured. Put another way, the modified touch algorithm may require a threshold rate of change for a threshold period of time prior to beginning touch monitoring.

Figure 12:
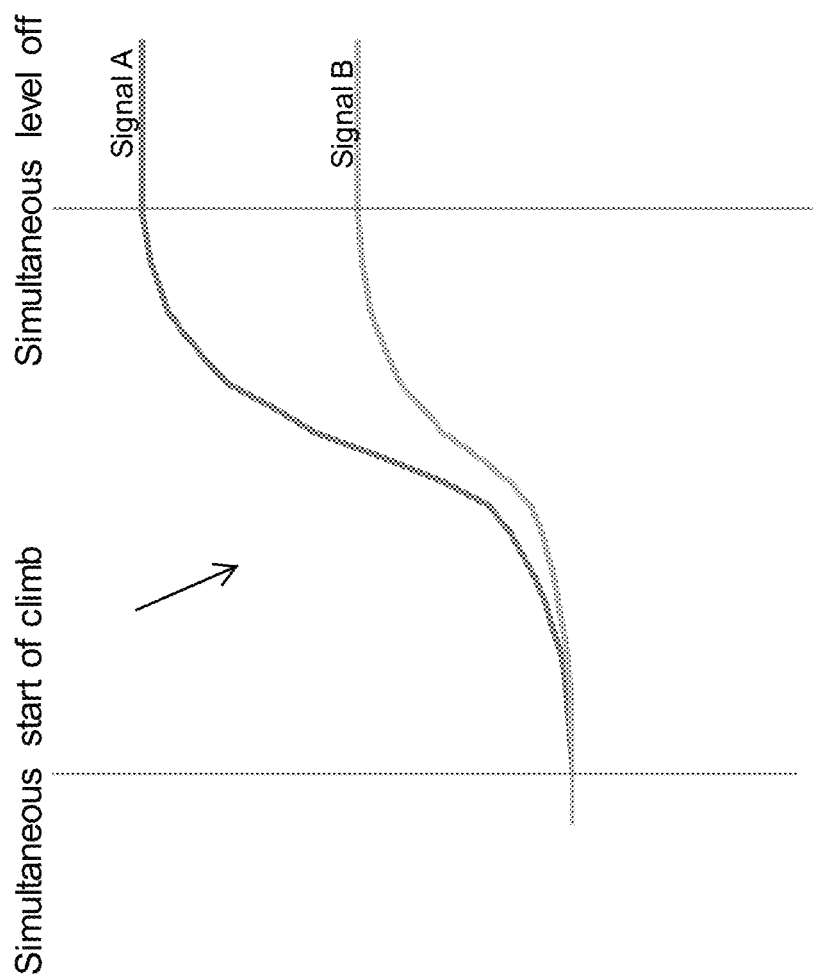
FIG. 12 is a plot multiple signals representing simultaneous touch events of the touch pad of the door handle.

Referring now to FIG. 12, optionally, the touch algorithm allows for detection of simultaneous events across multiple sensors (i.e., multiple touch pads 22) when the magnitude of each event is different. This allows for filtering of "system wide" stimuli that may indicate extraneous interference (e.g., water, etc.) instead of an event similar in proportion to the size of a human finger and/or hand. For example, events that simultaneously begin climbing and simultaneously begin leveling off may both be registered as touch events even when the magnitudes of the signal values differ. The difference in magnitudes may be the result of, for example, precipitation.

Thus, the door handle assembly of the present invention include a lighting module and one or more touch pads and implements a modified touching algorithm. The modified touching algorithm includes tolerances to more accurately determine touch events that may be associated with, for example, a user approaching or grabbing the door handle with their hand.

The lighting module may emit the selected or desired light color or pattern as a steady illumination, and/or may intermittently emit light or blink or flash at various rates depending on the particular event or input or trigger. For example, the lighting module may flash or emit a red light once to indicate the doors have been locked and may flash a red light intermittently to indicate a panic or hazard input or detection of a break in or the like. Optionally, the lighting module may provide fading and dimming of the light to ramp up the lighting intensity at activation and ramp down or fade the lighting intensity at deactivation of the lighting module.

Optionally, the lighting module and door handle assembly may provide various illumination patterns or logos or the like. Optionally, the lighting module and door handle assembly may provide personalized or customized lighting.

The door handle assembly may comprise any suitable type of door handle assembly, and may include or incorporate aspects of the door handle assemblies and lighting devices described in U.S. Pat. Nos. 6,349,450; 6,550,103; 6,907,643; 7,407,203; 8,333,492; 8,786,401 and/or 8,801,245, and/or U.S. Publication Nos. US-2010-0088855 and/or US-2010-0007463, which are hereby incorporated herein by reference in their entireties. Although shown as a strap type handle, the handle assembly may comprise any suitable type of vehicle door handle assembly, such as a paddle type vehicle door handle assembly (having a paddle or the like that may be pulled at to open the vehicle door) or other type of vehicle door handle assembly, while remaining within the spirit and scope of the present invention. Optionally, the door handle assembly may comprise a flush door handle assembly (such as of the types described in U.S. Pat. No. 8,786,401, which is hereby incorporated herein by reference in its entirety), whereby the lighting module may actuate to illuminate the handle portion and may emit light through the handle portion or around the handle portion. Optionally, the door handle assembly of the present invention may include a soft touch handle portion, such as utilizing the principles described in U.S. Pat. Nos. 6,349,450; 6,550,103 and/or 6,907,643, which are hereby incorporated herein by reference in their entireties The door handle assembly is thus operable to open the vehicle door when a user grasps the door handle portion at the side of the vehicle door. The door handle assembly may also be operable in conjunction with a passive keyless entry or other sensing system that is operable to determine whether or not the person at the vehicle door is authorized for entry into the vehicle, and may only open the vehicle door when that system recognizes the user or key fob or transmitting device associated with the owner or authorized user of the vehicle. Optionally, the door handle assembly may be associated with or in communication with a door zone module, such as by utilizing aspects of the vehicle door systems described in U.S. Publication No. US-2010-0007463, which is hereby incorporated herein by reference in its entirety.

Optionally, the lighting module may comprise a strip light or pocket light or the like, and the door handle assembly may include a ground illumination light and/or other light or lighting element, such as a projection light or the like, such as by utilizing aspects of the door handle assemblies and lighting systems described in U.S. Pat. Nos. 5,371,659; 5,497,305; 5,669,699; 5,823,654; 6,349,450; 6,550,103; 8,786,401 and/or 8,801,245, and/or U.S. Publication Nos. US-2010-0088855 and/or US-2010-0007463, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular exterior door system, the vehicular exterior door system comprising:

a door handle assembly comprising a handle portion, wherein the door handle assembly is configured for mounting at a door handle region of a vehicle door of a vehicle;

wherein, with the door handle assembly mounted at the door handle region, the handle portion is disposed at a pocket region of the door handle region;

wherein the door handle assembly comprises a pocket lighting module comprising at least one light emitting diode, and wherein, with the door handle assembly mounted at the door handle region, the at least one light emitting diode is operable to emit light to illuminate the pocket region of the door handle region;

wherein the door handle assembly comprises a plurality of touch sensors disposed at the handle portion, wherein the plurality of touch sensors are linearly arranged along the handle portion;

wherein a respective touch sensor of the plurality of touch sensors generates sensor data based on detection of touch at the respective touch sensor;

wherein the plurality of touch sensors comprises at least four touch sensors;

a processor operable to process sensor data generated by individual touch sensors of the plurality of touch sensors;

wherein the vehicular exterior door system, with the door handle assembly mounted at the door handle region, and responsive to processing at the processor of the sensor data generated by individual touch sensors of the plurality of touch sensors, determines a touch event at the door handle assembly;

wherein the determined touch event comprises a user touching the handle portion; and wherein the vehicular exterior door system, responsive to the determined touch event, unlocks the vehicle door.

2. The vehicular exterior door system of claim 1, wherein each touch sensor of the plurality of touch sensors has a respective touch sensitivity.

3. The vehicular exterior door system of claim 2, wherein the respective touch sensitivity of each touch sensor of the plurality of touch sensors is different from the touch sensitivities of other touch sensors of the plurality of touch sensors.

4. The vehicular exterior door system of claim 1, wherein a first touch sensor of the plurality of touch sensors is disposed at an end region of the handle portion and has a first touch sensitivity, and wherein a second touch sensor of the plurality of touch sensors is disposed at a central region of the handle portion and has a second touch sensitivity that is different than the first touch sensitivity of the first touch sensor.

5. The vehicular exterior door system of claim 1, wherein the at least one light emitting diode comprises a plurality of light emitting diodes.

6. The vehicular exterior door system of claim 5, wherein the linearly arranged touch sensors comprises a respective gap between adjacent touch sensors, and wherein each respective gap has a light emitting diode of the plurality of light emitting diodes disposed thereat.

7. The vehicular exterior door system of claim 1, wherein, with the door handle assembly mounted at the door handle region, light emitted by the at least one light emitting diode, when operated to emit light, reflects off the handle portion and toward the ground at a side of the vehicle at which the vehicle door is located.

8. The vehicular exterior door system of claim 1, wherein the plurality of touch sensors comprises no more than eight touch sensors.

9. The vehicular exterior door system of claim 1, wherein an output of an individual touch sensor disposed at an end region of the linearly arranged touch sensors is processed differently than an output of another individual touch sensor disposed at a central region of the linearly arranged touch sensors.

10. The vehicular exterior door system of claim 1, wherein at least one touch sensor of the plurality of touch sensors comprises a larger touch sensor that is dimensionally larger than other touch sensors of the plurality of touch sensors.

11. The vehicular exterior door system of claim 10, wherein, with the door handle assembly mounted at the door handle region of the vehicle door of the vehicle, the larger touch sensor of the plurality of touch sensors is operable to detect proximity of a user at the vehicle door and the other touch sensors of the plurality of touch sensors are operable to determine the touch event.

12. The vehicular exterior door system of claim 11, wherein the other touch sensors of the plurality of touch sensors operate in a sleep mode until the larger touch sensor detects proximity of the user at the vehicle door, and wherein, responsive to the larger touch sensor detecting proximity of the user at the vehicle door, the other touch sensors operate to determine the touch event.

13. The vehicular exterior door system of claim 1, wherein, in order to determine the touch event, the vehicular exterior door system determines that the sensor data generated by at least one touch sensor of the plurality of touch sensors comprises a sensor value that exceeds a first threshold value, and responsive to the sensor value exceeding the first threshold value, the vehicular exterior door system determines that the sensor value remains above the first threshold value and below a second threshold value for a threshold period of time.

14. The vehicular exterior door system of claim 1, wherein, in order to determine the touch event, the vehicular exterior door system determines that the sensor data generated by at least one touch sensor of the plurality of touch sensors comprises a sensor value that reaches a peak value that exceeds a touch recognition zone (TRZ) value, and responsive to the sensor value reaching the peak value, the vehicular exterior door system determines that the sensor value remains above a threshold value and the TRZ value for a threshold period of time, wherein the threshold value is greater than the TRZ value.

15. The vehicular exterior door system of claim 1, wherein the sensor data generated by at least one touch sensor of the plurality of touch sensors comprises a sensor value, and wherein, responsive to the sensor value of at least one of the plurality of touch sensors exceeding a touch recognition zone (TRZ) value and subsequently falling below the TRZ value before a threshold period of time has elapsed since the sensor value exceeded the TRZ value, the vehicular exterior door system declines determining any touch events for a threshold period of time.

16. The vehicular exterior door system of claim 1, wherein the sensor data generated by at least one touch sensor of the plurality of touch sensors comprises a sensor value, and wherein, in order to determine the touch event, the vehicular exterior door system determines a valid approach phase based on the sensor value from at least one of the plurality of touch sensors, and wherein the valid approach phase indicates proximity of a hand at the door handle region.

17. The vehicular exterior door system of claim 16, wherein the valid approach phase comprises a minimum increase of the sensor value over a threshold period of time.

18. The vehicular exterior door system of claim 1, wherein, responsive to processing of sensor data generated by the plurality of touch sensors, the vehicular exterior door system determines a plurality of simultaneous touch events.

19. The vehicular exterior door system of claim 1, wherein the plurality of touch sensors are grouped into a plurality of groups, and wherein outputs of touch sensors of the same group are processed together, and wherein each group of touch sensors provides a different touch zone along the handle portion.

20. The vehicular exterior door system of claim 1, wherein at least two of the plurality of touch sensors partially overlap.

21. The vehicular exterior door system of claim 1, wherein the door handle assembly comprises a printed circuit board having circuitry, and wherein the circuitry comprises the processor.

22. A vehicular exterior door system, the vehicular exterior door system comprising:
- a door handle assembly comprising a handle portion, wherein the door handle assembly is configured for mounting at a door handle region of a vehicle door of a vehicle;
- wherein, with the door handle assembly mounted at the door handle region, the handle portion is disposed at a pocket region of the door handle region;
- wherein the door handle assembly comprises a pocket lighting module comprising a plurality of light emitting diodes, and wherein, with the door handle assembly mounted at the door handle region, the plurality of light emitting diodes is operable to emit light to illuminate the pocket region of the door handle region;
- wherein the door handle assembly comprises a plurality of touch sensors disposed at least partially along the handle portion;
- wherein a respective light emitting diode of the plurality of light emitting diodes is disposed within a respective gap between adjacent touch sensors of the plurality of touch sensors;
- wherein a respective touch sensor of the plurality of touch sensors generates sensor data based on detection of touch at the respective touch sensor;
- a processor operable to process sensor data generated by individual touch sensors of the plurality of touch sensors;
- wherein the vehicular exterior door system, with the door handle assembly mounted at the door handle region, and responsive to processing at the processor of the sensor data generated by individual touch sensors of the plurality of touch sensors, determines a touch event at the door handle assembly;
- wherein the determined touch event comprises a user touching the handle portion; and
- wherein the vehicular exterior door system, responsive to the determined touch event, unlocks the vehicle door.

23. The vehicular exterior door system of claim 22, wherein each touch sensor of the plurality of touch sensors has a respective touch sensitivity.

24. The vehicular exterior door system of claim 23, wherein the respective touch sensitivity of each touch sensor of the plurality of touch sensors is different from the touch sensitivities of other touch sensors of the plurality of touch sensors.

25. The vehicular exterior door system of claim 22, wherein a first touch sensor of the plurality of touch sensors is disposed at an end region of the handle portion and has a first touch sensitivity, and wherein a second touch sensor of the plurality of touch sensors is disposed at a central region of the handle portion and has a second touch sensitivity that is different than the first touch sensitivity of the first touch sensor.

26. The vehicular exterior door system of claim 22, wherein, with the door handle assembly mounted at the door handle region, light emitted by the plurality of light emitting diodes, when operated to emit light, reflects off the handle portion and toward the ground at a side of the vehicle at which the vehicle door is located.

27. The vehicular exterior door system of claim 22, wherein the plurality of touch sensors comprises no more than eight touch sensors.

28. The vehicular exterior door system of claim 22, wherein an output of an individual touch sensor disposed at an end region of the handle portion is processed differently than an output of another individual touch sensor disposed at a central region of the handle portion.

29. The vehicular exterior door system of claim 22, wherein, responsive to processing of sensor data generated by the plurality of touch sensors, the vehicular exterior door system determines a plurality of simultaneous touch events.

30. The vehicular exterior door system of claim 22, wherein at least two of the plurality of touch sensors partially overlap.

31. The vehicular exterior door system of claim 22, wherein the door handle assembly comprises a printed circuit board having circuitry, and wherein the circuitry comprises the processor.

32. A vehicular exterior door system, the vehicular exterior door system comprising:
- a door handle assembly comprising a handle portion, wherein the door handle assembly is configured for mounting at a door handle region of a vehicle door of a vehicle;
- wherein, with the door handle assembly mounted at the door handle region, the handle portion is disposed at a pocket region of the door handle region;
- wherein the door handle assembly comprises a pocket lighting module comprising at least one light emitting diode, and wherein, with the door handle assembly mounted at the door handle region, the at least one light emitting diode is operable to emit light to illuminate the pocket region of the door handle region;
- wherein the door handle assembly comprises a plurality of touch sensors disposed at the handle portion, wherein the plurality of touch sensors are linearly arranged along the handle portion;
- wherein a respective touch sensor of the plurality of touch sensors generates sensor data based on detection of touch at the respective touch sensor;
- wherein the plurality of touch sensors comprises at least four touch sensors and no more than eight touch sensors;
- a processor operable to process sensor data generated by the plurality of touch sensors;
- wherein the plurality of touch sensors are grouped into a plurality of groups of touch sensors that provide different touch zones along the handle portion, and wherein outputs of touch sensors of the same group of touch sensors are processed together;

wherein the vehicular exterior door system, with the door handle assembly mounted at the door handle region, and responsive to processing at the processor of outputs of the of touch sensors, determines a touch event at the door handle assembly;

wherein the determined touch event comprises a user touching the handle portion; and wherein the vehicular exterior door system, responsive to the determined touch event, unlocks the vehicle door.

33. The vehicular exterior door system of claim 32, wherein each touch sensor of the plurality of touch sensors has a respective touch sensitivity.

34. The vehicular exterior door system of claim 33, wherein the respective touch sensitivity of each touch sensor of the plurality of touch sensors is different from the touch sensitivities of other touch sensors of the plurality of touch sensors.

35. The vehicular exterior door system of claim 32, wherein outputs of touch sensors of a first group of touch sensors are processed differently than outputs of touch sensors of a second group of touch sensors.

36. The vehicular exterior door system of claim 35, wherein the first group of touch sensors operates in a sleep mode until the second group of touch sensors detects proximity of a user at the vehicle door, and wherein, responsive to the second group of touch sensors detecting proximity of the user at the vehicle door, the first group of touch sensors operate to determine the touch event.

37. The vehicular exterior door system of claim 32, wherein at least two of the plurality of touch sensors partially overlap.

38. The vehicular exterior door system of claim 32, wherein the door handle assembly comprises a printed circuit board having circuitry, and wherein the circuitry comprises the processor.

* * * * *